US009500178B2

(12) United States Patent
Børgen et al.

(10) Patent No.: US 9,500,178 B2
(45) Date of Patent: Nov. 22, 2016

(54) WIND TURBINE ROTOR AND METHOD OF MOUNTING

(75) Inventors: Eystein Børgen, Rådal (NO); Bjørge Sæten, Nesttun (NO)

(73) Assignee: Sway Turbine AS, Bergen (NO)

( * ) Notice: Subject to any disclaimer, the term of this patent is extended or adjusted under 35 U.S.C. 154(b) by 572 days.

(21) Appl. No.: 14/003,742

(22) PCT Filed: Mar. 9, 2012

(86) PCT No.: PCT/EP2012/054097
§ 371 (c)(1),
(2), (4) Date: Nov. 12, 2013

(87) PCT Pub. No.: WO2012/120115
PCT Pub. Date: Sep. 13, 2012

(65) Prior Publication Data
US 2014/0072430 A1    Mar. 13, 2014

(30) Foreign Application Priority Data
Mar. 9, 2011   (GB) .................................. 1103971.6

(51) Int. Cl.
*F03D 1/00*   (2006.01)
*F03D 1/06*   (2006.01)

(52) U.S. Cl.
CPC ................. *F03D 1/001* (2013.01); *F03D 1/06* (2013.01); *F05B 2240/14* (2013.01);
(Continued)

(58) Field of Classification Search
CPC ..................... F03D 1/001; F03D 1/06; F05B 2240/14; F16C 2360/31; Y10T
(Continued)

(56) References Cited

U.S. PATENT DOCUMENTS

| 4,311,434 A | 1/1982 | Abe |
|---|---|---|
| 6,278,198 B1 | 8/2001 | Willis |

(Continued)

FOREIGN PATENT DOCUMENTS

| EP | 1 944 504 A1 | 7/2008 |
|---|---|---|
| EP | 2 184 489 A2 | 5/2010 |

(Continued)

OTHER PUBLICATIONS

PCT Search Report for International Application Serial No. PCT/EP2012/054097, filed Sep. 3, 2012, Applicant: Sway Turbine AS, consists of 3 unnumbered pages.

(Continued)

*Primary Examiner* — Igor Kershteyn (57) ABSTRACT

A wind turbine rotor assembly comprises: a rotor support; a rotor which is rotatably mounted to the rotor support; and a base support; wherein the rotor support and base support are provided with an engagement mechanism which allows the rotor support and base support to engage with each other so that when the rotor support and base support are moved together a hinged connection is formed between the rotor support and base support, which hinged connection allows the rotor support to rotate relative to the base support during installation or decommissioning of the rotor.

20 Claims, 6 Drawing Sheets

(52) U.S. Cl.
CPC .......... *F16C 2360/31* (2013.01); *Y02E 10/721* (2013.01); *Y02E 10/728* (2013.01); *Y10T 29/49316* (2015.01)

(58) Field of Classification Search
CPC ............ 29/49316;Y02E 10/728; Y02E 10/721
See application file for complete search history.

(56) References Cited

U.S. PATENT DOCUMENTS

| | | | | |
|---|---|---|---|---|
| 6,614,125 | B2* | 9/2003 | Willis | F03D 1/001 290/45 |
| 6,857,508 | B2* | 2/2005 | Miller | B66B 19/005 187/401 |
| 7,207,777 | B2* | 4/2007 | Bervang | B66C 1/108 416/119 |
| 7,218,013 | B2* | 5/2007 | Platt | F03D 11/04 290/55 |
| 7,296,974 | B2* | 11/2007 | Wobben | F03D 1/003 416/111 |
| 7,442,009 | B2* | 10/2008 | Arel | F03D 7/0268 416/142 |
| 8,069,634 | B2* | 12/2011 | Livingston | F03D 1/001 52/120 |
| 8,230,660 | B2* | 7/2012 | Muhlhauser | F03D 11/00 52/40 |
| 8,316,614 | B2* | 11/2012 | Soe-Jensen | B66C 1/62 416/1 |
| 8,496,423 | B2* | 7/2013 | Springett | B63B 27/16 414/10 |
| 2008/0063525 | A1 | 3/2008 | Becker | |
| 2010/0065524 | A1 | 3/2010 | Stommel | |
| 2010/0096855 | A1 | 4/2010 | Siegfriedsen | |

FOREIGN PATENT DOCUMENTS

| | | |
|---|---|---|
| JP | 11-255596 | 9/1999 |
| WO | WO 01/83290 A | 11/2001 |
| WO | WO 2007/043894 A | 4/2007 |
| WO | WO 2010/091654 A | 8/2010 |
| WO | WO 2011/006526 | 1/2011 |

OTHER PUBLICATIONS

Intellectual Property Office Search Report for Application Serial No. GB1103971.6, date of search: Jul. 8, 2011, pp. 18-19.

* cited by examiner

WIND TURBINE ROTOR AND METHOD OF MOUNTING

This application claims priority to and is a 371 of International Application PCT/EP2012/054097, filed Mar. 9, 2012, which claims priority to UK Patent Application GB 1103971.6, filed Mar. 9, 2011.

FIELD OF THE INVENTION

The invention relates to wind turbine rotors and methods of mounting and installing wind turbine rotors. The invention is applicable to both offshore and onshore applications.

BACKGROUND OF THE INVENTION

It is known to position wind turbines both offshore (at sea) and onshore (on land) for the purpose of converting wind energy into other forms of energy, such as electrical energy. The typical method for installing a wind turbine rotor is one of the following:
1) Install one blade at the time with a single crane
2) Install the hub and 2 blades together in a "bunny" position and then install the last blade, both using a single crane
3) Install the entire rotor and hub (3 blades pre-installed on the hub) in one lift using a main crane to lift the rotor from the ground in a horizontal position and then using an assisting crane to up-end the rotor assembly in the air before installing the rotor assembly on the wind turbine All the existing methods have the disadvantages of either performing several offshore lifts or having to use an assisting crane in addition to the main crane in order to install the rotor.

SUMMARY OF THE INVENTION

The invention provides a wind turbine rotor assembly, and a method of mounting a wind turbine rotor, as set out in the accompanying claims.

Embodiments of the invention will now be described, by way of example only, with reference to the accompanying drawings.

DESCRIPTION OF PREFERRED EMBODIMENTS

Figure 1:
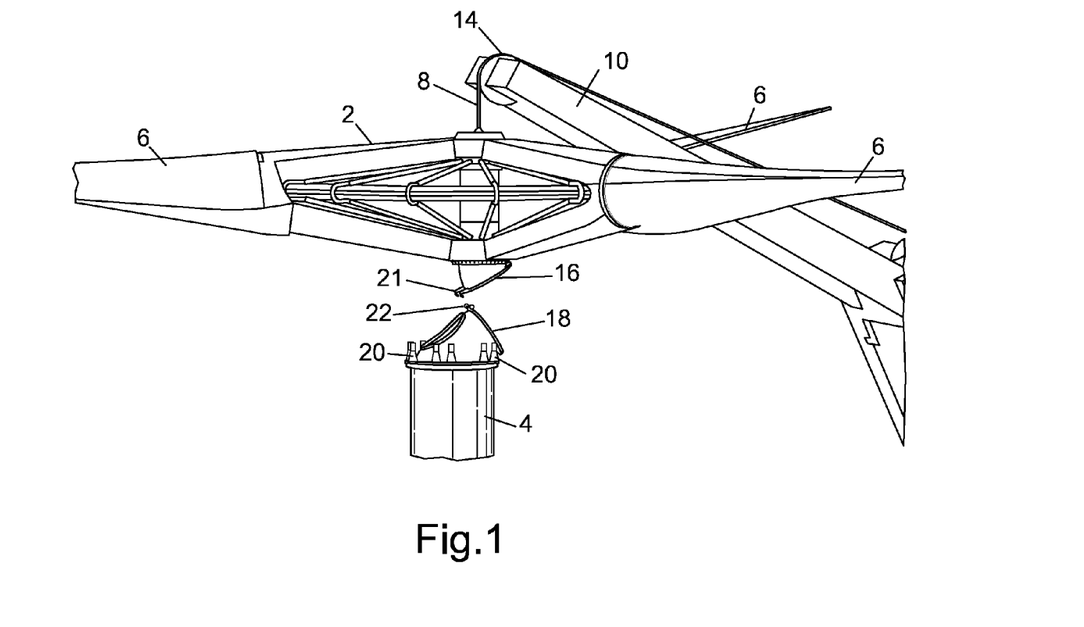
FIG. 1 shows step 1 in a method of mounting a wind turbine rotor on a supporting tower.

FIG. 1 shows step 1 in a method of mounting a rotor 2 on a supporting tower 4. In this example, the rotor 2 has three blades 6, and the weight of the rotor is typically in the range of 50 to 400 tonnes (ie. 50,000 to 400,000 Kg). In FIG. 1 the rotor is suspended in a generally horizontal position by the crane wire 8 of a crane 10. In this position the blades 6 of the rotor 2 lie in a substantially horizontal plane, and the intended axis of rotation 12 of the rotor 2 is substantially vertical, as shown in FIG. 1.

The crane wire 8 runs over a wheel 14 at the tip of crane 10. The portion of crane wire 8 between the wheel 14 and the rotor 2 is vertical and generally in line with the intended axis of rotation 12 of the rotor 2.

On the underside of the rotor 2 there is provided a rotor support 16, which is a supporting structure which is rotatably mounted to the rest of the rotor 2. The rotor support 16 is provided with two hooks or hook structures 21.

As shown in FIG. 1, the top of the supporting tower 4 is provided with a base support structure 18, which is bolted to the supporting tower 4 by bolts 20. The base support 18 is provided with a hook receiving structure 22 (described in greater detail below) which is arranged to receive, and engage with, the hook structures 21 in order to form a hinged connection between the rotor support 16 and the base support 18.

Figure 2:
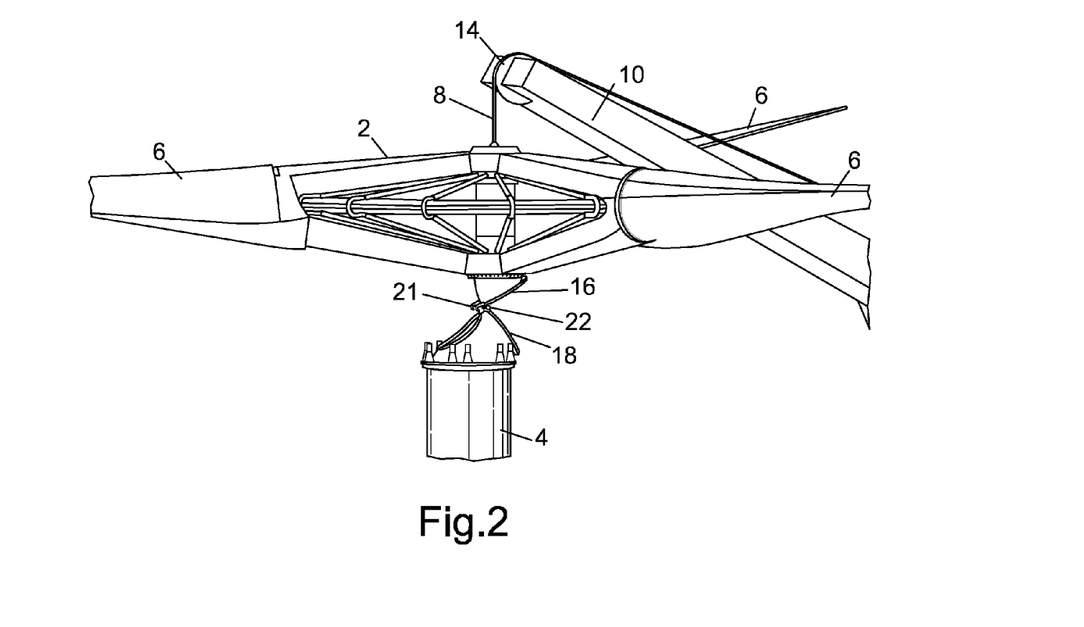
FIG. 2 shows step 2 of the method.

FIG. 2 shows step 2 in the process, in which the rotor 2 is lowered, for example by extending the crane wire 8 over the wheel 14, until the hooks 21 are adjacent to, and at approximately the same height as, the receiving structure 22 on the base support 18.

Figure 3:
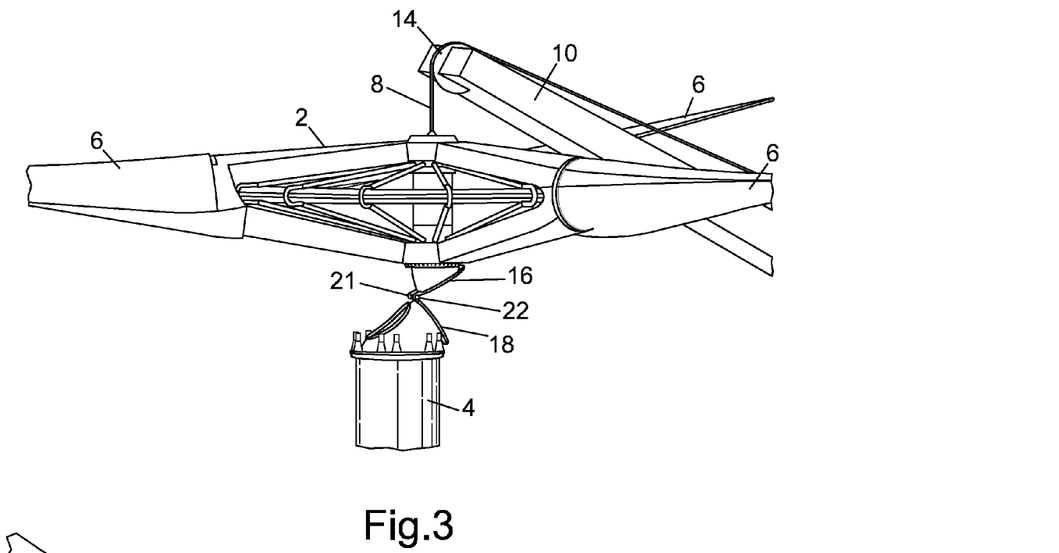
FIG. 3 shows step 3 of the method, in which hooks on the rotor engage with a supporting structure on the tower.

In FIG. 3 the rotor 2 is moved sideways by the crane 10 until the hooks 21 on the rotor support 16 engage with the receiving structure 22 on the base support 18, so that a hinged connection is formed between the rotor support 16 and the base support 18. Consequently a hinged connection is also formed between the rotor 2 and the supporting tower 4.

Figure 4:
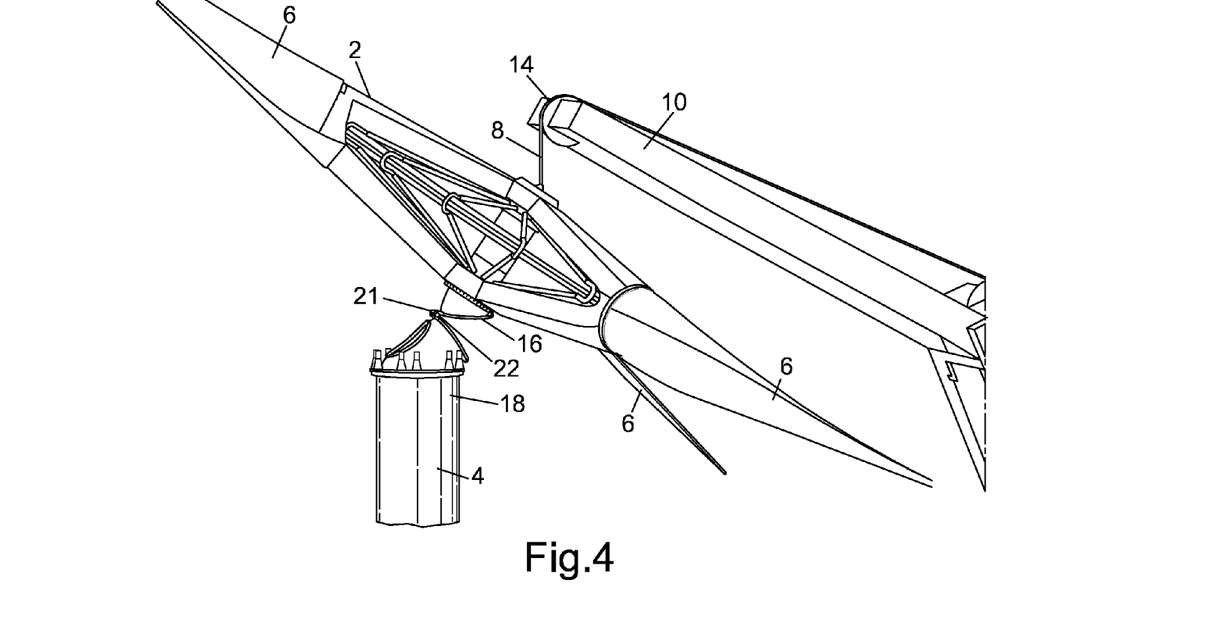
FIG. 4 shows step 4 in the method, in which the rotor is rotated on the hooks.

Referring to FIG. 4, the crane 10 and/or crane wire 8 are now moved so that the rotor 2 is lowered, whilst rotating about the hinge formed by engagement of the hooks 21 in the receiving structure 22. In FIG. 4 the rotor 2 has reached a midway position, and has turned through an angle of about 45° from its horizontal starting position shown in FIG. 3.

Figure 5:
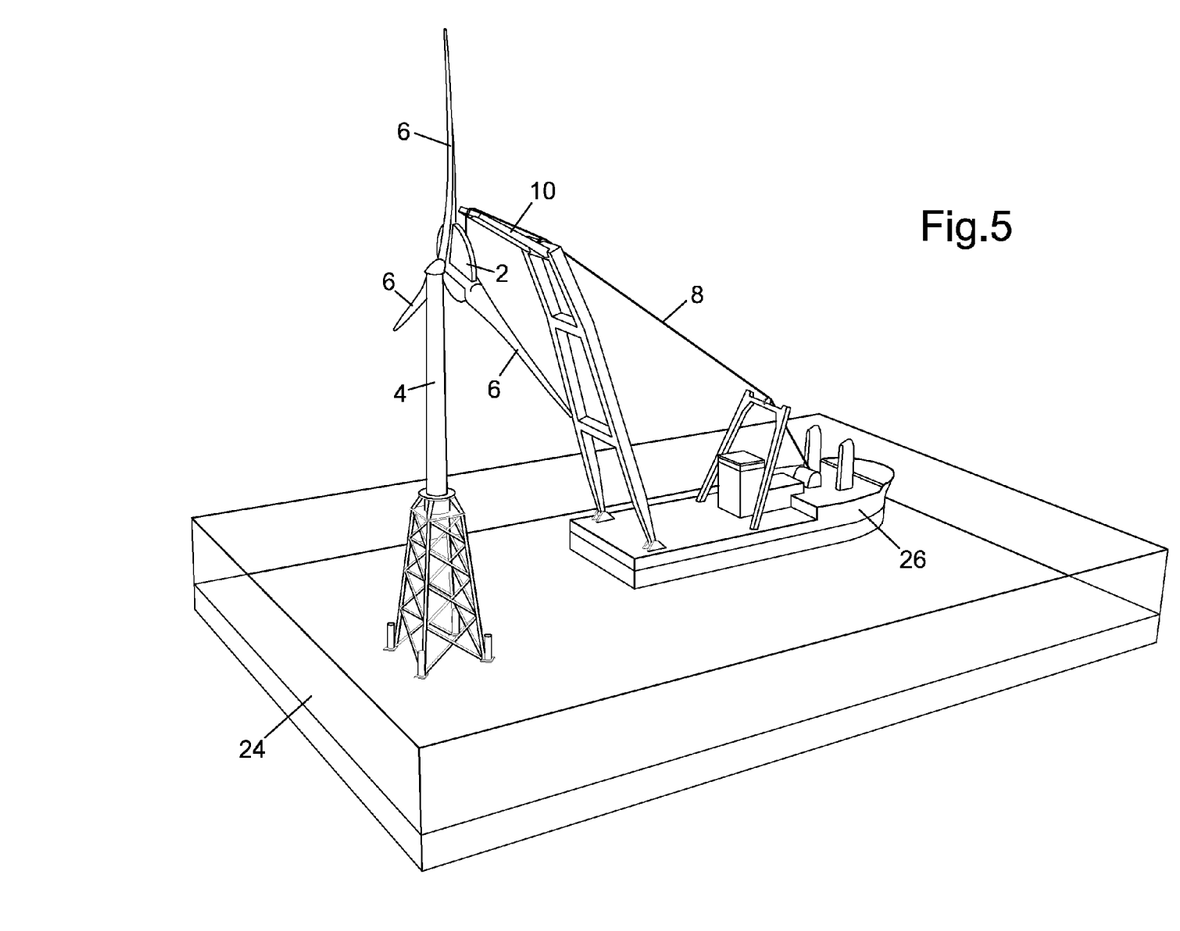
FIG. 5 shows step 5 in the method, in which the rotor has reached its final position.

The rotor 2 continues to rotate about a substantially horizontal axis until it reaches the substantially vertical potion shown in FIG. 5. FIG. 5 shows an offshore embodiment in which the tower 4 is mounted on the seabed 24 and the crane 10 is mounted on a boat 26. Onshore embodiments are also possible.

The method described has the advantage that the entire rotor can be pre-assembled in a horizontal position onshore, transported to the wind turbine and than installed onto the wind turbine in one piece using only one crane.

Figure 6:
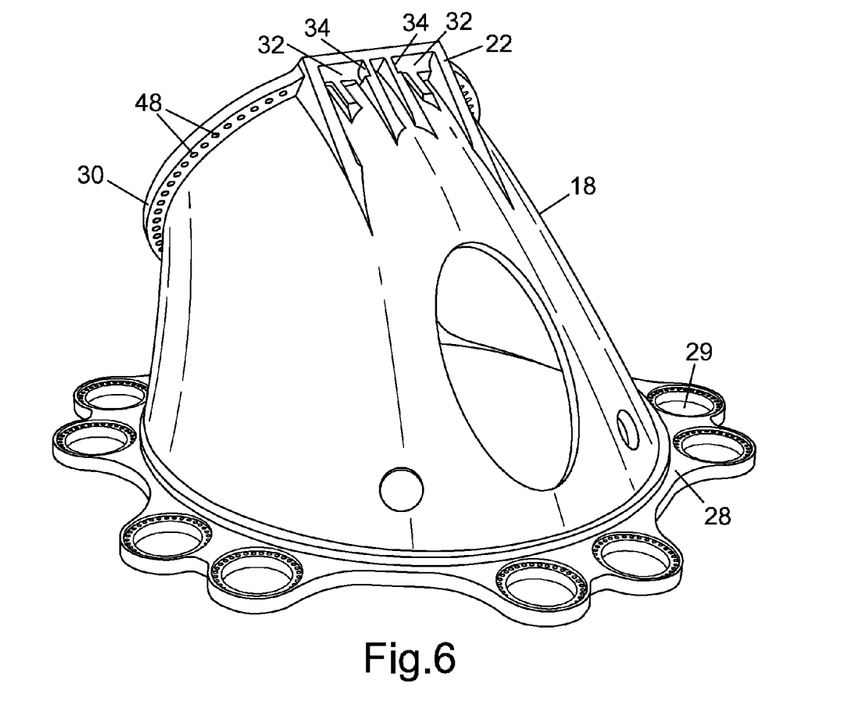
FIG. 6 shows a base support structure.

FIG. 6 shows the base support 18 in greater detail. The base support 18 is provided with a generally circular flange 28 provided with apertures 29 which allow the base support 18 to be bolted to the supporting tower 4 as shown in FIG. 1. The other end of the base support 18 is provided with a base support flange 30, which we refer to hereinafter as base support flange 30, and which lies in a plane which is at about 45° relative to the plane containing the first flange 28.

FIG. 6 also shows the receiving structure 22 in greater detail. The receiving structure 22 is positioned adjacent the base support flange 30, and defines two semi-cylindrical, or partially cylindrical, recesses 32, each of which extends along an axis which is substantially horizontal in use, and which lies parallel with a plane containing the base support flange 30. At the inside end of each semi-cylindrical recess 32 there is defined a generally circular or part-circular recess 34.

Figure 7:
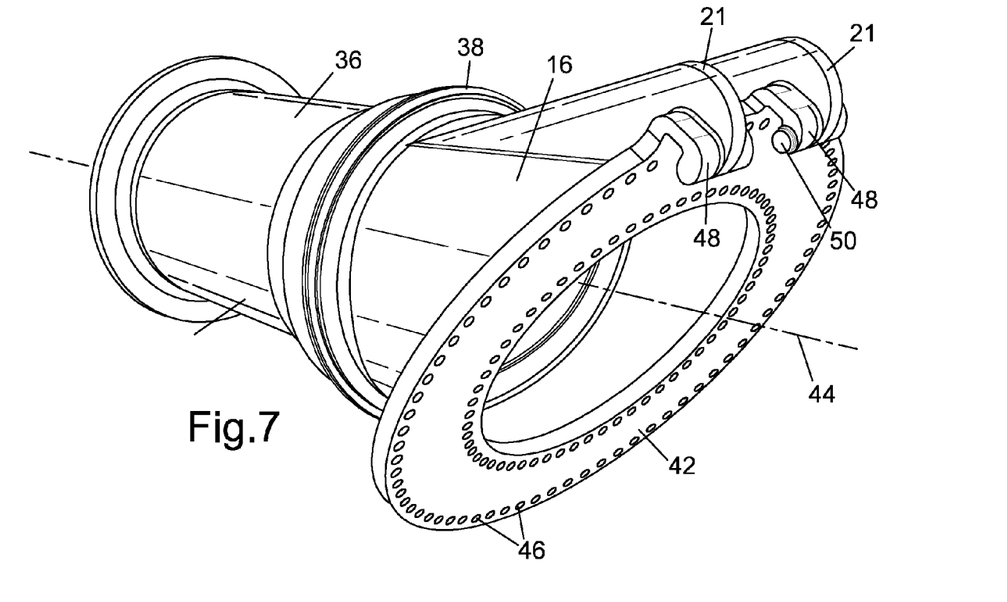
FIG. 7 shows a rotor support structure.

FIG. 7 shows the rotor support 16 in greater detail. In FIG. 7 the rotor support 16 is shown rotatably mounted to the axle 36 of the rotor 2. The axle 36 is provided with a bearing section 38.

The rotor support 16 is provided with a generally circular rotor support flange 42 which lies in a plane which intersects the axis of rotation 44 of the rotor axle 36, and hence also of rotor 2, at an angle of about 45°. The rotor support flange 42 is provided with a series of apertures 46 which are designed to align with apertures 48 in the base support flange 30 shown in FIG. 6. This allows the rotor support flange 42 to be bolted securely to said base support flange 30 when the rotor reaches its final position shown in FIG. 5.

FIG. 7 also shows the hook structures 21 of the rotor support 16 in greater detail. Each hook structure 21 is provided with a generally cylindrical portion 48, which is adapted to fit snugly into a respective one of said semi-cylindrical recesses 32 in order to form a hinged connection between the rotor support 16 and the base support 18. At the inside end of each cylindrical portion 48 there is provided a circular protrusion 50 which is adapted to fit snugly into a respect one of said circular recesses 34 formed in the receiving structure 22. Once each circular protrusion 50 has engaged with a respective circular recess 34, the hook structures 21 are unable to slip out of the receiving structure 22 when the rotor is lowered from its horizontal position to its vertical position as shown in FIG. 4.

Figure 8:
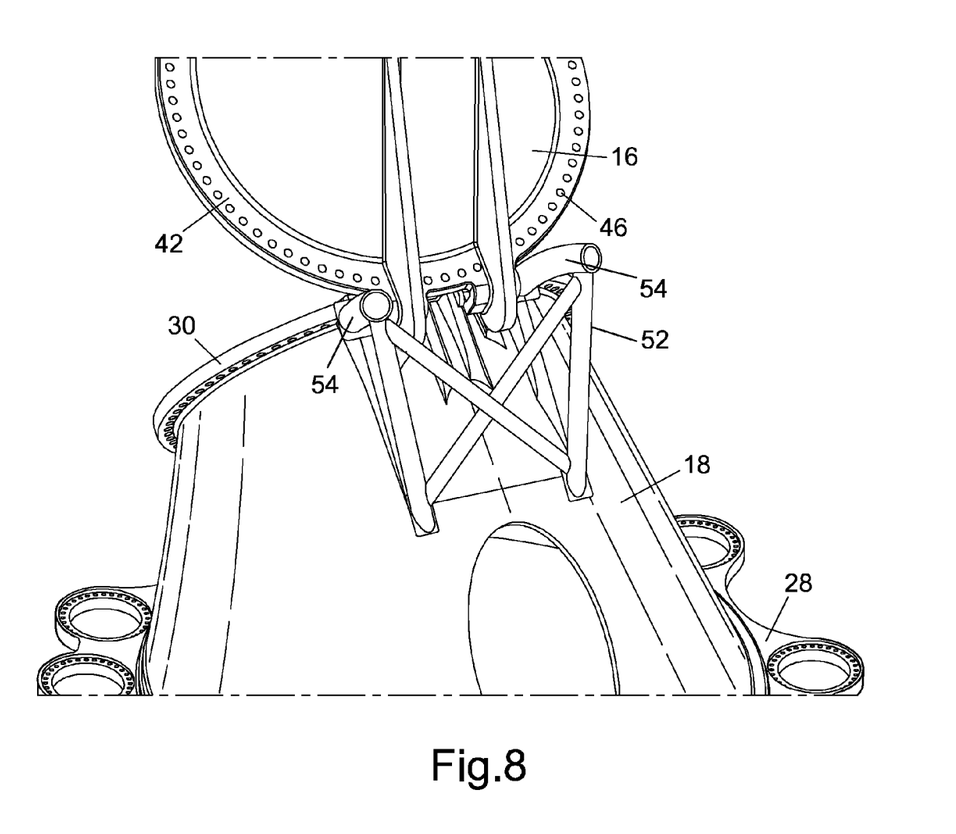
FIG. 8 shows the base support engaged with the rotor support in a position corresponding with FIG. 3.

FIG. 8 shows the rotor support 16 engaged with the base support 18 in the initial position shown in FIG. 3. FIG. 8 also shows a primary horizontal guiding system 52 which is provided on the base support 18. This guiding system 52 comprises two curved tubular guides which guide the hooks structures 21 into the receiving structure 22 as the rotor support 16 is moved towards the base support 18. A hydraulic damping cylinder (not shown) is also mounted in the vertical direction to avoid large vertical impact loads between the rotor support 16 and the base support 18 when these structures first make contact.

Figure 9:
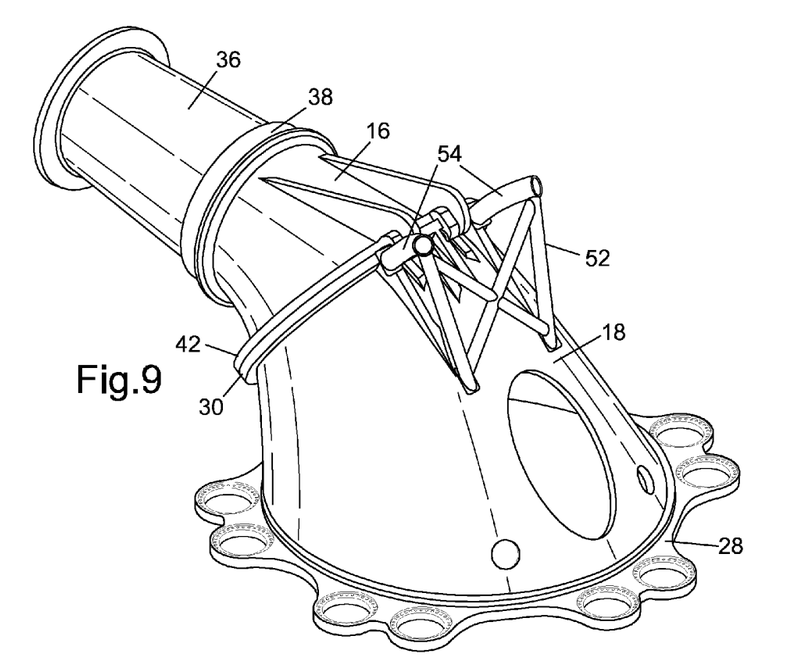
FIG. 9 shows the rotor support engaged with the base support in a final position corresponding with FIG. 5.

FIG. 9 shows the rotor support 16 engaged with the base support 18 in the final position of FIG. 5.

Figure 10:
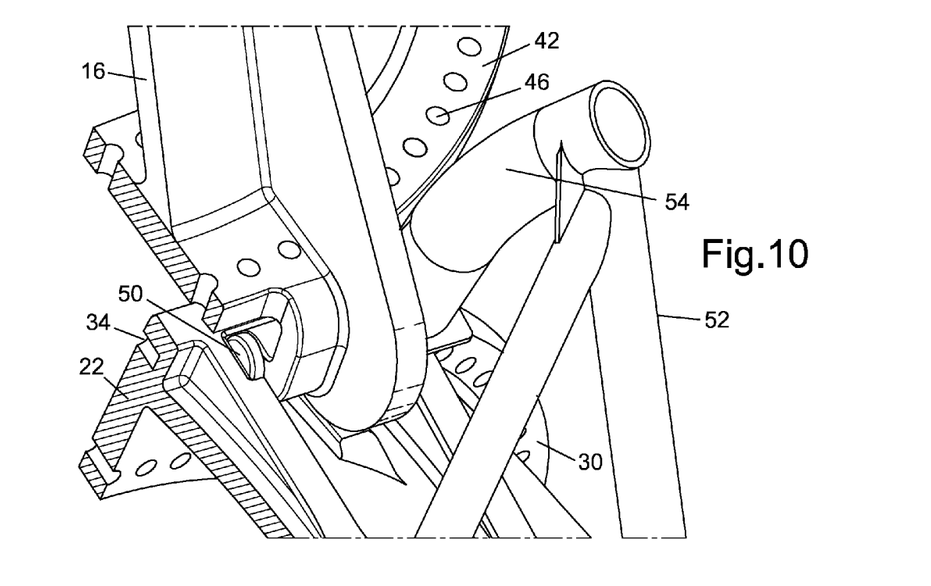
FIG. 10 shows a portion of the hinge connection between the base support and rotor support in greater detail.

FIG. 10 shows one of the hook structures 21 engaged in the receiving structure 22. In this Figure it can be seen more clearly how the circular protrusion 50 fits snugly within the circular recess 34 in order to prevent the hook structure 21 from slipping away from the base support flange 30 of the base support 18.

Referring to FIG. 7, for example, it can be seen that the rotor support flange 42 lies in a plane which is inclined at an angle of 45 degrees relative to rotor axis of rotation 44. As shown in FIG. 9, the rotor support flange 42 abuts the base support flange 30 in order to limit the hinged movement of the rotor support 16 and hence define the final position of the rotor support 16 shown in FIG. 9. In this final position the base support flange 30 also lies in a plane which lies at 45 degrees to the rotor axis 44. An advantage of inclining the flanges 30 and 42 is that the area of the flanges are thereby increased which results in increased strength.

It should be appreciated that the flanges 30 and 42 may be inclined at different angles. Ideally the flanges 30 and 42 are arranged in planes which are not perpendicular to the rotor axis 44 or to the central longitudinal axis of the tower itself, and in general a range of angles between 10 and 80 degrees relative to the rotor axis 44 are possible. It should also be understood that the flanges 30 and 42 do not have to be completely flat, and could for example by made slightly wavy or have another profile. In this case the flanges 30 and 42 would not be completely planar, but would lie generally within a plane.

For wind turbines with a direct drive generator a fixed shaft (the rotor support 16) for the rotor is normally preferred. This has the advantage of small fatigue loadings since the shaft do not see cyclic gravity loading from the weight of the rotor in contrast to a rotating shaft. The rotor for such a construction is normally mounted to the fixed shaft (the rotor support 16) via one or two main bearings. The fixed shaft (rotor support 16) is then normally bolted to the nacelle main frame (the base support 18) during the installation of the rotor. The nacelle main frame carries the load from the fixed shaft via a bend of approximately 80-90 degrees to connect to the yaw bearing at the top of the supporting wind turbine tower. To reduce the costs of the bearing(s) as small as possible bearings should be used providing the bearing life itself is satisfactory. The minimum size of the bearing will dictate the size of the shaft (the rotor support 16) diameter. The most critical part of the structural integrity of the fixed shaft (rotor support 16) is normally the bolted flange connection. The diameter of the fixed shaft is therefore often driven by the necessary size of the flange which again might drive the inner diameter of the bearing (assuming the fatigue life of the bearing is satisfactory) and hence the cost of the bearings. For such a situation it is desirable to find a solution where a larger flange with more bolts can be used between the fixed shaft (rotor support 16) and the main frame (base support 18) without having to increase the diameter of the fixed shaft (rotor support 16) and hence the size of the rotor bearing(s).

In the described embodiments the flanges 30 and 42 between the rotor support 16 and the base support 18 are arranged within the bend between the fixed shaft longitudinal axis and the tower axis. By providing the flange faces at an angle different from 90 degrees to the rotor support 16 and the rotor axis of rotation a larger flange diameter is provided without increasing the diameter of the rotor support 16 and the bearing diameter. The preferred flange face plane is approximately 45 degrees to the rotor axis of rotation thereby increasing the flange diameter by approximately the square root of 2 and the moment of resistance to withstand bending moment by 2 (100% increase) assuming unchanged bolt diameter.

In the embodiment shown in FIG. 9, both the rotor support flange 42 and base support flange 30 are circular. The bearing arrangement 38 and the flange 28 are also circular, and the rotor support 16 and base support 18 are therefore both shaped so as to allow both ends of each support 16 and 18 to be circular. Circular flanges can have the advantage of being easier to machine, and also of avoiding excessive strain on any particular bolts around the circumference of the flange. However, other embodiments are possible in which the rotor support flange 42 and base support flange 30 are elliptical or have different shapes.

It should also be understood that the flanges described above can be used regardless of whether or not the rotor support 16 is hingedly connected to the base support 18.

The invention may also be defined by any of the following numbered paragraphs, which correspond with the claims of the priority application (UK Patent Application GB 1103971.6, filed Mar. 9, 2011).

1. A wind turbine rotor assembly comprising:
    a rotor support;
    a rotor which is rotatably mounted to the rotor support; and a base support;
wherein the rotor support and base support are provided with engagement means which allow said rotor support and base support to engage with each other when the rotor support and base support are moved together, so as to form a joint between the rotor support and base support which allows the rotor support to rotate relative to the base support during installation or decommissioning.

2. A wind turbine rotor assembly as defined in paragraph 1, wherein the rotor support and base support are arranged to releasably connect with each other when the rotor support and base support are moved together.

3. A wind turbine rotor assembly as defined in paragraph 1 or 2, wherein said joint between said rotor support and base support is a hinged connection.

4. A wind turbine rotor assembly as defined in paragraph 3, wherein said hinged connection is arranged to allow said rotor and rotor support to hinge about a substantially horizontal axis in use.

5. A wind turbine rotor assembly as defined in any preceding paragraph, wherein said engagement means comprises at least one male mating portion, said male mating portion being provided on at least one of said rotor support and said base support.

6 A wind turbine rotor assembly as defined in paragraph 5, wherein said male mating portion includes at least one hook.

7. A wind turbine rotor assembly as defined in paragraph 5 or 6, wherein said male mating portion comprises at least one cylindrical portion, which may be cylindrical, semi-cylindrical or part-cylindrical in shape, and wherein said cylindrical portion has a longitudinal axis which, in use, forms the axis of rotation of a hinged connection between said rotor support and base support.

8. A wind turbine rotor assembly as defined in paragraph 5, 6 or 7, wherein said male mating portion is provided with a generally circular protrusion.

9. A wind turbine as defined in paragraph 8, wherein said generally circular protrusion is provided at the end of said cylindrical portion.

10. A wind turbine rotor assembly as defined in any one of paragraphs 5 to 9, wherein said engagement means comprises at least one recess, said recess being provided on at least one of said rotor support and said base support, and said recess being adapted to receive said male mating portion in order to form said joint between the rotor support and base support.

11. A wind turbine rotor assembly as defined in paragraph 10, when also dependent directly or indirectly on paragraph 7, wherein said recess comprises at least one cylindrical recess, which may be cylindrical, semi-cylindrical or part-cylindrical in shape, and which is adapted to receive said cylindrical portion of said male mating member so as to form said joint between the rotor support and base support.

12. A wind turbine rotor assembly as defined in paragraph 10 or 11, when also dependent directly or indirectly on paragraph 8 or 9, wherein said engagement means comprises at least one generally circular recess adapted to receive said generally circular protrusion so as to prevent, in use, said male mating portion from leaving said at least one recess when the rotor support is rotated relative the base support.

13. A wind turbine rotor assembly as defined in any preceding paragraph, wherein said joint is arranged to allow the rotor support to rotate relative to the base support through an angle of about 90 degrees.

14. A wind turbine rotor assembly as defined in any preceding paragraph, wherein a guiding structure is provided for guiding said rotor support and base support into engagement with each other when said rotor support and base support are moved together to form said joint.

15. A wind turbine rotor assembly as defined in paragraph 14, wherein said guiding structure comprises at least two guide members, and wherein the distance between said two guide members decreases with decreasing distance from said base support.

16. A wind turbine rotor assembly as defined in any preceding paragraph, which further comprises hydraulic damping means for damping the impact between the rotor support and the base support as the rotor support and base support are moved into engagement with each other.

17. A wind turbine rotor assembly as defined in any preceding paragraph, wherein:
said rotor is rotatably mounted to said rotor support about a rotor axis;
said rotor support is provided with a rotor support surface which lies generally in a first plane;
said base support is provided with a base support surface which lies generally in a second plane;
said rotor support surface and base support surface are arranged to abut each other to limit the rotation of the rotor support and thereby define a final position for said rotor support; and
said first plane is arranged at an angle so that it is not perpendicular to said rotor axis.

18. A wind turbine rotor assembly as defined in paragraph 17, wherein said first plane is arranged at an angle of between 10 and 80 degrees relative to said rotor axis.

19. A wind turbine rotor assembly as defined in paragraph 17, wherein said first plane is arranged at an angle of between 20 and 70 degrees relative to said rotor axis.

20. A wind turbine rotor assembly as defined in paragraph 17, wherein said first plane is arranged at an angle of between 30 and 60 degrees relative to said rotor axis.

21. A wind turbine rotor assembly as defined in paragraph 17, wherein said first plane is arranged at an angle of between 40 and 50 degrees relative to said rotor axis.

22. A wind turbine rotor assembly as defined in any one of paragraphs 17 to 21, wherein said rotor support surface is formed from a flange on said rotor support.

23. A wind turbine rotor assembly as defined in any one of paragraphs 17 to 22, wherein said base support surface is formed from a flange on said base support.

24. A method of mounting a wind turbine rotor on a base support, said rotor being rotatably mounted on a rotor support, said method comprising the steps of:
suspending said rotor in a generally horizontal position;
moving said rotor support into engagement with said base support in order to form a joint between the rotor support and base support; and
rotating said rotor about said joint from said generally horizontal position to a generally vertical position.

25. A method as defined in paragraph 24, wherein said joint between the rotor support and the base support is a hinged connection.

26. A method as defined in paragraph 24 or 25, wherein said base support is provided on, or is part of, a supporting tower adapted to support said rotor.

27. A method as defined in any one of paragraphs 24 to 26, wherein said step of suspending said rotor is performed by a crane.

28. A method as defined in paragraph 27, wherein said step of moving said rotor is performed by said crane.

29. A wind turbine rotor assembly comprising:
a rotor support;
a rotor which is rotatably mounted to the rotor support about a rotor axis; and
a base support;
wherein:
said rotor support is provided with a rotor support surface which lies generally in a first plane;
said base support is provided with a base support surface which lies generally in a second plane;
said rotor support surface and base support surface are arranged to abut each other to support said rotor; and
said first plane is arranged at an angle so that it is neither perpendicular to, nor parallel with, said rotor axis.

30. A wind turbine rotor assembly as defined in paragraph 29, wherein said first plane is arranged at an angle of between 10 and 80 degrees relative to said rotor axis.

31. A wind turbine rotor assembly as defined in paragraph 29, wherein said first plane is arranged at an angle of between 20 and 70 degrees relative to said rotor axis.

32. A wind turbine rotor assembly as defined in paragraph 29, wherein said first plane is arranged at an angle of between 30 and 60 degrees relative to said rotor axis.

33. A wind turbine rotor assembly as defined in paragraph 29, wherein said first plane is arranged at an angle of between 40 and 50 degrees relative to said rotor axis.

34. A wind turbine rotor assembly as defined in any one of paragraphs 29 to 33, wherein said rotor support surface is formed from a flange on said rotor support.

35. A wind turbine rotor assembly as defined in any one of paragraphs 29 to 34, wherein said base support surface is formed from a flange on said base support.

36. A wind turbine rotor assembly as defined in any one of paragraphs 29 to 35, wherein said rotor support surface is generally circular.

37. A wind turbine rotor assembly as defined in any one of paragraphs 29 to 35, wherein said rotor support surface is generally elliptical.

38. A wind turbine rotor assembly as defined in any one of paragraphs 29 to 37, wherein said base support is, or is part of, the nacelle main frame of a wind turbine.

39. A wind turbine rotor assembly as defined in any one of paragraphs 29 to 38, which also has the features of any of paragraphs 1 to 16.

The invention claimed is:
1. A wind turbine rotor assembly comprising:
a rotor support;
a rotor which is rotatably mounted to the rotor support; and
a base support;
wherein the rotor support and base support are provided with engagement means which allow said rotor support and base support to engage with each other so that when the rotor support and base support are moved together a hinged connection is formed between the rotor support and the base support, which hinged connection allows the rotor support to rotate relative to the base support during installation or decommissioning of the rotor.

2. The wind turbine rotor assembly as claimed in claim 1, wherein the rotor support and the base support are arranged to releasably connect with each other when the rotor support and the base support are moved together.

3. The wind turbine rotor assembly as claimed in claim 1, wherein said hinged connection is arranged to allow said rotor and the rotor support to hinge about a substantially horizontal axis in use.

4. The wind turbine rotor assembly as claimed in claim 1, wherein said engagement means comprises at least one male mating portion, said at least one male mating portion being provided on at least one of said rotor support and said base support.

5. The wind turbine rotor assembly as claimed in claim 4, wherein said at least one male mating portion includes at least one hook.

6. The wind turbine rotor assembly as claimed in claim 4, wherein said at least one male mating portion comprises at least one cylindrical portion, the at least one cylindrical portion is at least one of: a cylindrical in shape, a semi-cylindrical in shape or a part-cylindrical in shape, and wherein said at least one cylindrical portion has a longitudinal axis which, in use, forms the axis of rotation of a hinged connection between said rotor support and the base support.

7. The wind turbine rotor assembly as claimed in claim 4, wherein said at least one male mating portion is provided with a generally circular protrusion.

8. The wind turbine rotor assembly as claimed in claim 7, wherein said at least one male mating portion comprises at least one cylindrical portion, the at least one cylindrical portion is at least one of: a cylindrical in shape, a semi-cylindrical in shape or a part-cylindrical in shape, wherein said at least one cylindrical portion has a longitudinal axis which, in use, forms the axis of rotation of a hinged connection between said rotor support and the base support, and wherein said generally circular protrusion is provided at the end of said at least one cylindrical portion.

9. The wind turbine rotor assembly as claimed in claim 4, wherein said engagement means comprises at least one recess, said at least one recess being provided on at least one of said rotor support and said base support, and said at least one recess being adapted to receive said at least one male mating portion in order to form a joint between the rotor support and the base support.

10. The wind turbine rotor assembly as claimed in claim 9, wherein said at least one male mating portion is provided with a generally circular protrusion, and wherein said at least one recess comprises at least one cylindrical recess, the at least one cylindrical recess is at least one of: a cylindrical in shape, a semi-cylindrical in shape or a part-cylindrical in shape, and which is adapted to receive a cylindrical portion of said at least one male mating portion so as to form said joint between the rotor support and the base support.

11. The wind turbine rotor assembly as claimed in claim 9, wherein said at least one male mating portion is provided with a generally circular protrusion, and wherein said engagement means comprises at least one generally circular recess adapted to receive said generally circular protrusion so as to prevent, in use, said at least one male mating portion from leaving said at least one recess when the rotor support is rotated relative the base support.

12. The wind turbine rotor assembly as claimed in claim 1, wherein a joint is arranged to allow the rotor support to rotate relative to the base support through an angle of about 90 degrees.

13. The wind turbine rotor assembly as claimed in claim 1, wherein a guiding structure is provided for guiding said rotor support and the base support into engagement with each other when said rotor support and the base support are moved together to form a joint.

14. The wind turbine rotor assembly as claimed in claim 13, wherein said guiding structure comprises at least two guide members, and wherein a distance between said at least two guide members decreases with decreasing distance from said base support.

15. The wind turbine rotor assembly as claimed in claim 1, which further comprises hydraulic damping means for damping an impact between the rotor support and the base support as the rotor support and the base support are moved into engagement with each other.

16. The wind turbine rotor assembly as claimed in claim 1, wherein:
   said rotor is rotatably mounted to said rotor support about a rotor axis;
   said rotor support is provided with a rotor support surface which lies generally in a first plane;
   said base support is provided with a base support surface which lies generally in a second plane;
   said rotor support surface and the base support surface are arranged to abut each other to limit a rotation of the rotor support and thereby define a final position for said rotor support; and
   said first plane is arranged at an angle so that it is not perpendicular to said rotor axis.

17. The wind turbine rotor assembly as claimed in claim 16, wherein said first plane is arranged at an angle of between 10 and 80 degrees relative to said rotor axis.

18. A method of mounting a wind turbine rotor on a base support, said wind turbine rotor being rotatably mounted on a rotor support, said method comprising the steps of:
   suspending said wind turbine rotor in a generally horizontal position;
   moving said rotor support into engagement with said base support in order to form a hinged connection between the rotor support and the base support; and
   rotating said rotor support relative to said base support about said hinged connection, so as to rotate said wind turbine rotor from said generally horizontal position to a generally vertical position.

19. The method as claimed in claim 18, wherein said step of suspending said wind turbine rotor includes suspending said wind turbine rotor above said base support by means of a flexible cable.

20. The method as claimed in claim 18, wherein said step of rotating said rotor support includes rotating said rotor support by means of lowering a height at which said wind turbine rotor is suspended.

* * * * *